(12) United States Patent
Liao

(10) Patent No.: US 7,654,136 B2
(45) Date of Patent: Feb. 2, 2010

(54) TIRE PRESSURE SENSOR CAPABLE OF PREVENTING PRESSURE AND MOISTURE DAMAGE

(75) Inventor: Ming-Kuan Liao, Baoshan Shiang (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 0 days.

(21) Appl. No.: 11/878,415

(22) Filed: Jul. 24, 2007

(65) Prior Publication Data

US 2008/0314135 A1 Dec. 25, 2008

(30) Foreign Application Priority Data

Jun. 21, 2007 (TW) .............................. 96210072 U

(51) Int. Cl.
*B60C 23/02* (2006.01)
(52) U.S. Cl. ...................................... 73/146.8
(58) Field of Classification Search ................ 73/146.8, 73/146
See application file for complete search history.

(56) References Cited

U.S. PATENT DOCUMENTS

| 6,779,392 | B2 * | 8/2004 | Bell et al. ................... 73/146.8 |
| 6,911,903 | B2 * | 6/2005 | Gladstone et al. ........... 340/442 |
| 7,377,156 | B1 * | 5/2008 | Mattson et al. ............... 73/146 |
| 7,437,919 | B1 * | 10/2008 | Wu .............................. 73/146 |
| 2006/0179929 | A1 * | 8/2006 | Becker ........................ 73/146 |

* cited by examiner

*Primary Examiner*—Andre J Allen
(74) *Attorney, Agent, or Firm*—Muncy, Geissler, Olds & Lowe, PLLC

(57) ABSTRACT

A tire pressure sensor including a body, a sealing member and a circuit and signal transmission apparatus is provided. The body includes a first casing, a first hole, a receiving portion and a second casing. The receiving portion connects with the first hole passing through the first casing. The sealing member includes a second hole that is set through the rubber component of and communicates with the first hole. The sealing member is located in the receiving portion. The circuit and signal transmission apparatus includes a circuit apparatus and a hole. The hole positioned on the surface of the circuit apparatus communicates with the first hole and second hole to form an air seal channel. The air pressure of the tire is injected through the air seal channel into the hole, and the tire pressure sensor can detect the pressure and temperature of the air of the tire.

4 Claims, 3 Drawing Sheets

TIRE PRESSURE SENSOR CAPABLE OF PREVENTING PRESSURE AND MOISTURE DAMAGE

RELATED APPLICATIONS

This application claims priority to Taiwan Application Serial Number 96210072, filed Jun. 21, 2007, which is herein incorporated by reference.

BACKGROUND OF THE INVENTION

1. Field of Invention

The present invention relates to a tire pressure sensor. More particularly, the present invention relates to a tire pressure sensor in which the air pressure of the tire is conducted to a signal transmission apparatus of the tire pressure sensor.

2. Description of Related Art

A tire pressure sensor monitors a vehicle's tire pressure and displays real-time pressure values on a dashboard display while the vehicle is moving. When the pressures in the tire either exceeds a pre-set high pressure value or is lower than a pre-set low pressure value, the tire pressure sensor will send a warning signal to the vehicle operator. The value of real-time monitoring of proper inflation pressure in a vehicle's tires has been demonstrated both in vehicle safety and in minimizing tire wear. At a low tire pressure, the sidewall of the tire is deformed and can often lead a tire blowout. At a high tire pressure, one or more tires lead to uneven tread wear and economic loss.

Therefore, the tire pressure sensor improves vehicle safety and aids drivers in maintaining their vehicle tires. Properly maintained tires ensure vehicle safety, performance and economy.

For the foregoing reasons, there is a need to develop a tire pressure sensor through the inflated hole to detect the air pressure of the tire and display real-time pressure values on a dashboard display. When the tire pressure sensor is connected to a tire valve stem, the air pressure of the tire and the air pressure of the tire pressure sensor are the same. Exposing the tire pressure sensor to high air pressures when the vehicle is moving fast is dangerous. The air pressure of the tire may be flat in the hole in which the tire pressure sensor is installed. The tire pressure sensor therefore does not report the correct air pressure. The air pressure of the tire may then break the complex apparatus and the electronic device.

SUMMARY OF THE INVENTION

It is therefore an objective of the present invention to provide a tire pressure sensor to solve the problem that can withstand the extreme air pressures in the tire of a vehicle that is moving fast.

It is another an objective of the present invention to provide a tire pressure sensor in which the PCB module and other parts are not damaged by water vapor and other contaminants when air is injected into the chamber of the tire.

In accordance with the foregoing and other objectives of the present invention, a tire pressure sensor comprises a body, a sealing member and a circuit and signal transmission apparatus. The body comprises a first casing, a second casing, a first hole, a receiving portion and a second casing. The first hole passes through the first casing. The receiving portion is set in the first casing and is connected to the edge of the first hole. The first casing is assembled with the second casing to form a chamber in the body. The sealing member comprises a second hole. The second hole sets through the sealing member and communicates with the first hole. The sealing member is set in the receiving portion of the body. The circuit and signal transmission apparatus comprises a circuit apparatus and a hole. A hole communicating with the first hole and the second hole is located in the surface of the circuit apparatus. An air seal channel is placed around the first hole and the second hole. The air in the tire moves to the hole through the air seal channel. The hole on the integrated circuit 310 detects the pressure and temperature of air of the tire. The signal transmission apparatus then communicates the air pressure to the circuit apparatus.

In conclusion, the invention provides an air seal channel that prevents air pressure in the body and protects the PCB module and other parts of the sensor apparatus from being damaged by water vapor and contaminants when air is injected into the chamber.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
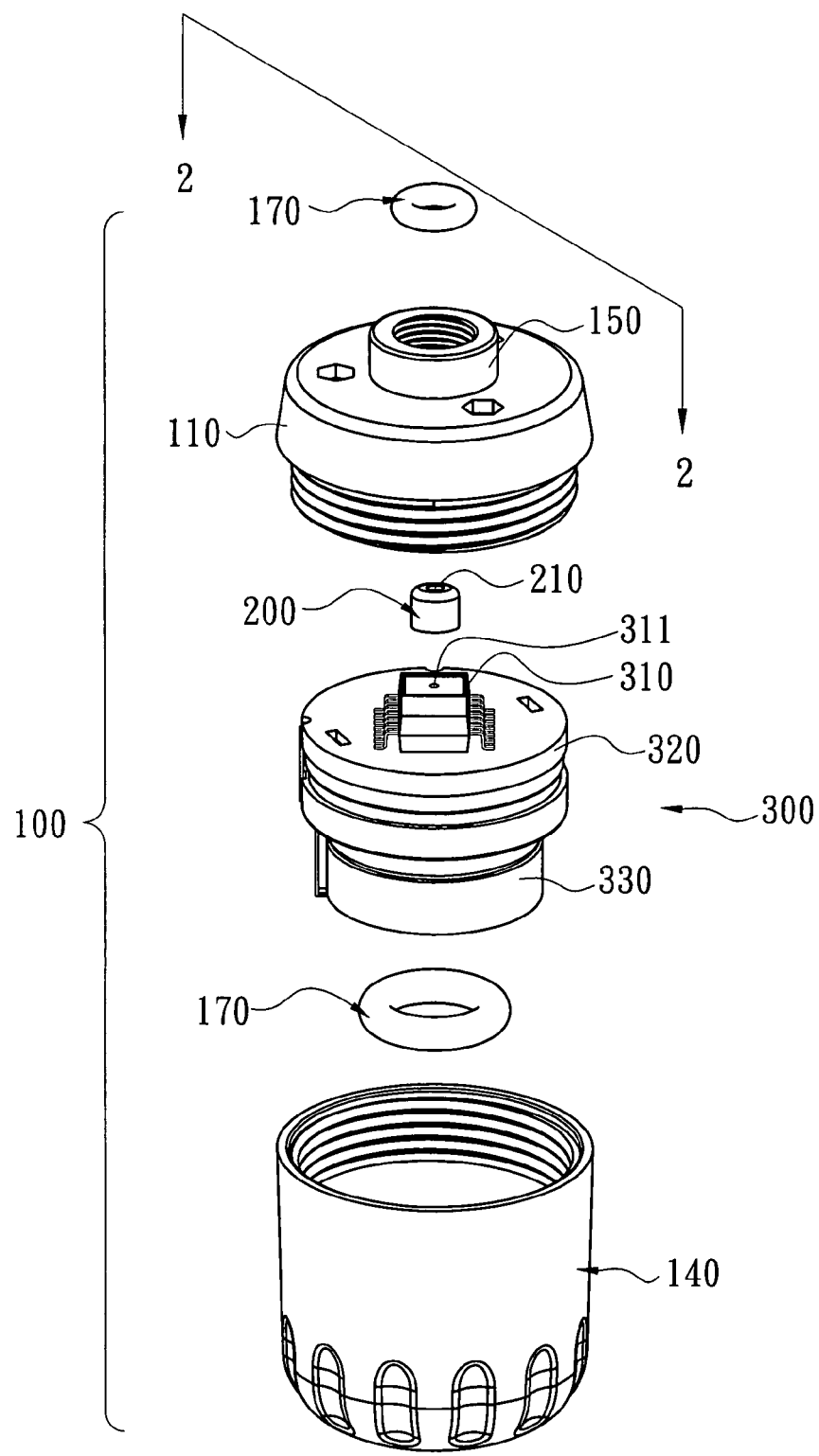
FIG. 1 is an exploded, perspective view of a tire pressure sensor of an embodiment in accordance with the present invention.

Reference will now be made in detail to the present preferred embodiment of the invention, examples of which are illustrated in the accompanying drawings. Wherever possible, the same reference numbers are used in the drawings and the description to refer to the same or like parts.

Figure 2:
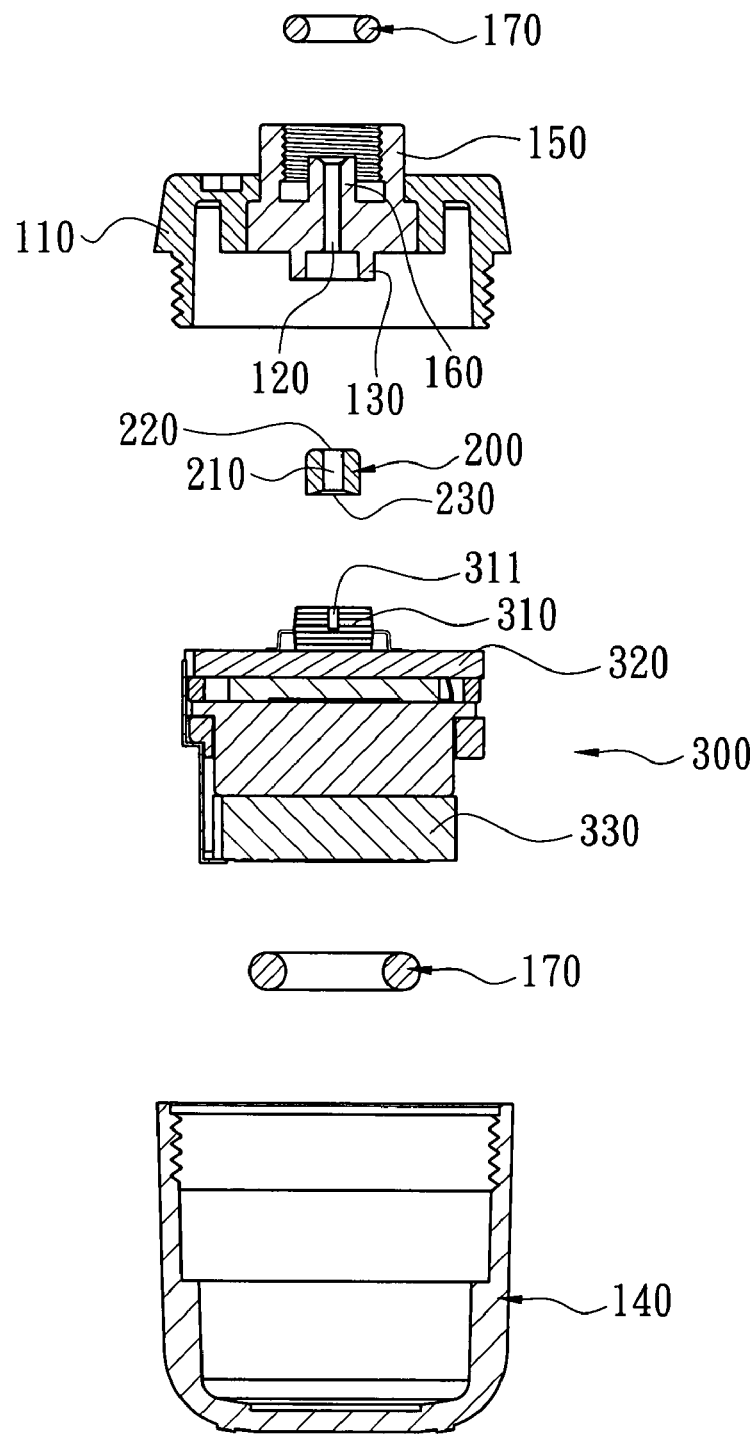
FIG. 2 is a section view of the tire pressure sensor along line 2-2 of FIG. 1.
Figure 3:
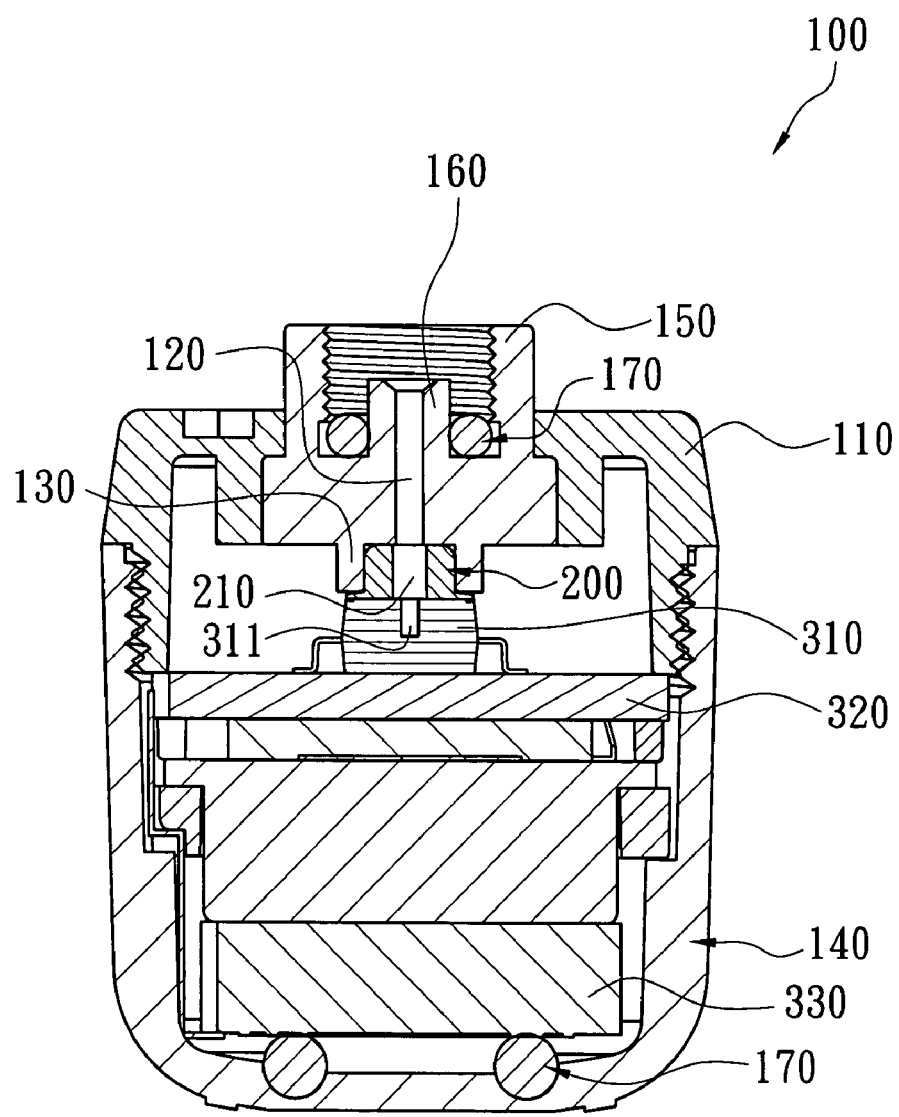
FIG. 3 is a section view of the tire pressure sensor along line 2-2 of FIG. 1.

Refer to FIG. 1, FIG. 2 and FIG. 3, FIG. 1 is an exploded, perspective view of an embodiment of a tire pressure sensor in accordance with the present invention.

FIG. 2 is a cross-section view on the line 2-2 of FIG. 1.

FIG. 3 is a central section view on the line 2-2 of FIG. 1.

The tire pressure sensor comprises a body 100, a sealing member 200 and a sensing member 300.

The body 100 comprises a first casing 110, a first hole 120, a receiving portion 130, a second casing 140, a connector 150, a projection 160, and a plurality of ring 170. The first hole 120 passes through the projection 160. The receiving portion 130 is located under the first hole 120 of the first casing 110. The second casing 140 is connected with the first casing 110 to form a chamber in the body 100. The connector 150 connects the inflating valve of the tire. A screw connects the connector 150 of the tire pressure sensor to the tire valve stem. The projection 160 is located in the center of the connector 150. The ring 170 is located between the connector 150 and projection 160.

The sealing member 200 comprises a second hole 210, a first surface 220 and a second surface 230. The sealing member 200 is a cylinder member. An end of the sealing member is squeezed into the receiving portion 130. The second hole 210 extends from the first surface 220 into the second surface 230. The first surface 220 is pressed on a bottom of the receiving portion 130 to seal air. The second surface 230 slants to the second hole 210. The outermost edge of the second surface 230 is higher than the second hole 210. When the sealing member 200 is set in the receiving portion 130, the sealing member 200 protrudes into the receiving portion 130. The second surface 230 of sealing member 200 fills the gap between the receiving portion 130 and the surface on the integrated circuit 310. The surface of the integrated circuit 310 and the second surface 230 of the sealing member 200 are sealed to each other when the second surface 230 of the sealing member 200 is connected with the surface on the integrated circuit 310. The first casing 110, the sealing member 200 and the sensing member 300 are fixed by the plurality of the ring in the body. An air seal channel is formed by the first hole 120 and the second hole 210. The air in the tire passes through the air seal channel into the hole 311 on the integrated circuit 310. The hole 311 on the integrated circuit 310 detects the pressure and temperature of the tire air. When air in the tire is injected into the hole 311 through the air seal channel, the body 100 will not become a pressure chamber and reduce the pressurization of the tire pressure sensor. The opening size of the second hole 210 is smaller than the surface of the integrated circuit 310 and protects the PCB module and other components from being damaged by water vapor and contaminants when air is injected into the body 100.

The material of the sealing member 200 is rubber that comprises NBR (Butadiene—Acrylontrile Rubber), EPDM (Ethylene Eropylene Diene rubber), CR (Chloroprene Rubber) and silicone rubber. The rubber has properties of oxidation resistant, air seal and increasing the used time.

The sensing member 300 comprises an integrated circuit 310, a hole 311, a circuit board 320 and a signal transmission apparatus 330. The integrated circuit 310 comprises a sensor and a central processing unit. The signal transmission apparatus 330 comprises a transmitter. The hole 311 on the integrated circuit 310 detects the pressure and temperature of the air in the tire through the air seal channel. The air seal channel is formed by the first hole 120 and the second hole 210. The central processing unit of the integrated circuit 310 calculates a signal that detects the pressure and temperature of the air. After calculating, the signal is transmitted to the signal transmission apparatus 330. The signal transmission apparatus 330 transmits a radio frequency signal to the dashboard display. The driver can monitor the air pressure and temperature of the tire.

Therefore, the tire pressure sensor is formed in an air seal channel through the first hole 120 and the second hole 210. The pressure and temperature of the air of the tire that is injected into the air seal channel is detected through the hole 311. The gas seal channel prevents excessive pressure in the body 100 and protects the PCB module and other components from being damaged by water vapor and contaminants when air is injected into the body 100.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tire pressure sensor, comprising:
a body including a chamber therein and a connector for connection of an inflating valve of a tire, wherein said connector has a first hole in communication with said chamber;
a sealing member, which is received in said chamber of said body and has a first surface pressed on an interior end of said connector and a second surface opposite to said first surface, having a second hole in communication with said first hole of said connector;
a sensing member having an integrated circuit for sensing pressure, wherein said integrated circuit has a hole on a top thereof, and said second surface of said sealing member is pressed on said top of said integrated circuit, and said hole is in communication with said second hole of said sealing member;
wherein said first hole of said connector and second hole of said sealing member form an air seal channel that is isolated from said chamber of said body to allow air of said tire directly flowing to said hole of said integrated circuit.

2. The tire pressure sensor of claim 1, wherein said connector has a receiving portion on said interior end thereof that said sealing member is squeezed into said receiving portion with said first surface pressed on a bottom of said receiving portion.

3. The tire pressure sensor of claim 1, wherein a diameter of said second hole of said connector is greater than that of said hole of said integrated circuit of said sensing member.

4. The tire pressure sensor of claim 1, wherein said second surface of said sealing is slanted from an edge toward said second hole.

* * * * *